R. TRENOWITH.
SPOON HOLDER.
APPLICATION FILED JULY 17, 1913.
1,113,918.
Patented Oct. 13, 1914.
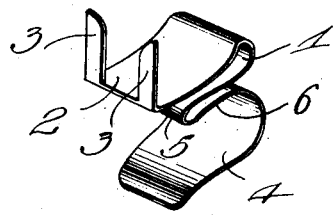
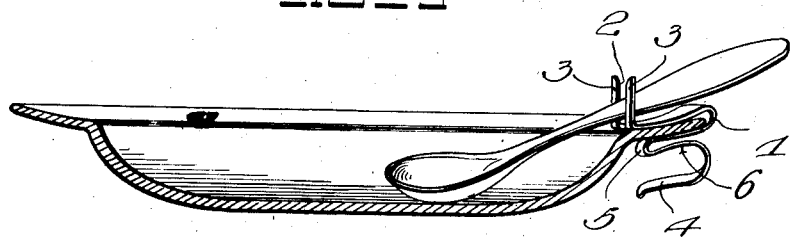
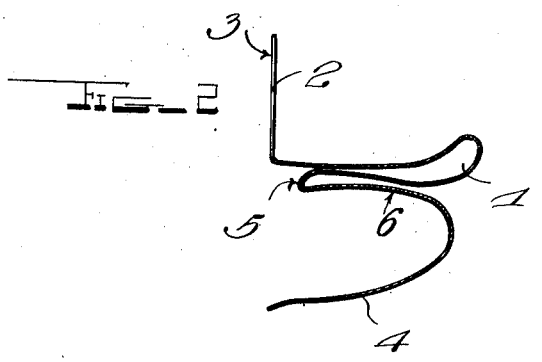
Witnesses
Inventor
Romilly Trenowith
By H. B. Willson &co
Attorneys

UNITED STATES PATENT OFFICE.

ROMILLY TRENOWITH, OF McGILL, NEVADA.

SPOON-HOLDER.

1,113,918.   Specification of Letters Patent.   Patented Oct. 13, 1914.

Application filed July 17, 1913. Serial No. 779,603.

*To all whom it may concern:*

Be it known that I, ROMILLY TRENOWITH, a citizen of the United States, residing at McGill, in the county of White Pine and State of Nevada, have invented certain new and useful Improvements in Spoon-Holders; and I do declare the following to be a full, clear, and exact description of the invention, such as will enable others skilled in the art to which it appertains to make and use the same.

This invention relates to kitchen and table articles, and more especially it is a device for holding a spoon on the edge of a dish such as a plate, so that it will not slip into the contents thereof.

The particular object of the invention is to produce a strip metal spoon holder of this character which is especially constructed to provide ease in its application to and detachment from the edge of the plate, so that the latter will not be nicked or chipped in either event.

A still further object of my invention is to provide a device of this character which may be so utilized as to support both a spood and a cup or similar article.

To this end the invention consists in the details of construction hereinafter more fully described and claimed.

In the accompanying drawings: Figure 1 is a perspective view of my improved spoon holding attachment; Fig. 2 is a vertical cross sectional view thereof; Fig. 3 is a vertical section of a dish showing a perspective view of the invention applied thereto and holding a spoon in position therein.

My improved spoon holder is preferably constructed from a single strip of resilient or spring metal of suitable width. This is bent or folded upon itself to form a dish engaging loop 1 standing substantially horizontal when in use. Its outer portion is rounded to conform to the shape of the edge of the dish while the material forming the lower jaw of the loop normally inclines upwardly toward the upper jaw as shown. When this loop is applied to the dish, said lower jaw of the loop is sprung or forced away from the upper jaw to admit the edge of the plate which is thus firmly gripped between the upper and lower jaws of the loop. The metal of which the loop is formed while being resilient is sufficiently stiff to cause the loop 1 to tightly grasp the plate and thus prevent the casual removal or disengagement of the same from the dish. The end of the strip at the inner end of the upper jaw of the loop is bent straight upward as at 3 and has formed therein a deep notch 2 which produces a fork having a pair of spoon retaining fingers between which the narrow or reduced intermediate portion of the handle of the spoon is placed. These fingers form stops to engage the inner portion of the enlarged outer end of the handle of the spoon and thus prevent the handle from slipping through between said fingers and falling into the contents of the dish. The fingers are preferably rounded on their inner upper corners to form a flaring entrance to the space between the fingers which will facilitate the engagement of the handle with said space. The lower end of the strip after forming the loop 1 is bent or folded back at 5 and carried outward beneath and substantially parallel with the lower side of the loop 1 as at 6, and finally it is carried downward and again inward to form an inwardly opening hook 4 which is of sufficient size to permit one finger to be readily engaged therewith for the purpose of removing the attachment from the plate. During such operation the tip of the thumb will be placed against the outside of the upstanding fork 3, and the index finger will doubtless be passed through the hook 4, then the operator pushes gently with the thumb and meanwhile gently retracts the finger and the result is that the loop 1 is opened so that its upper and lower jaws disengage the edge of the plate after which the loop can be slipped off the same without injury to the finest piece of crockery, glassware or precious metal. The attachment is reapplied to the dish or plate by a reversal of this operation, in case the operator does not care to push the rounded portion 5 onto the edge of the plate, although this could be done where no great cause for care is apparent. A further function which arises from the peculiar construction of this attachment is this, that when applied to the edge of the dish or plate as seen in Fig. 3, the thumb may bear down upon the upper jaw of the loop and one finger may pass through the hook while another finger rests against the outer side of the body of the plate—thus affording a support for carrying the plate from point to point as might be useful if the dish were hot. In this case also the attachment can be applied to and removed from the edge of the dish by the operation above described.

By providing the lower auxiliary jaw 6 it will be noted that the disposition of my improved holder may be reversed, that is, the flange of the dish instead of being engaged between the upper and lower jaws may be disposed between the lower jaw and the auxiliary jaw 6 in which case the finger engaging piece would be disposed outwardly instead of inwardly as now shown. When in this position, it is to be seen that the lower finger engaging piece 4 may be readily utilized to support a cup or like receptacle while the spoon engaging fingers as before, receive the spoon handle. This is a convenient arrangement when my device is used in connection with a receptacle holding a quantity of liquid that is to be removed by a cup or small glass having a handle such as is used with a punch bowl, etc.

From the foregoing description taken in connection with the accompanying drawings, the construction and operation of the invention will be readily understood without requiring a more extended explanation.

Having thus described my invention, what I claim is:

An article of the character described comprising a resilient strip of uniform width, bent intermediate its ends to form upper and lower resilient jaws, the former being concaved longitudinally and having its free end extended upwardly substantially at right-angles thereto and notched to form oppositely disposed spoon retaining fingers, the latter having its free end folded back into underlying relation with respect thereto to form an auxiliary jaw to coöperate with said lower jaw, said auxiliary jaw having its free end folded inwardly and brought to an offset and underlying position with respect to said auxiliary jaw substantially as and for the purpose set forth.

In testimony whereof I have hereunto set my hand in presence of two subscribing witnesses.

ROMILLY TRENOWITH.

Witnesses:
D. N. LIDDELL,
E. ANKERS.